United States Patent
Zhang et al.

(10) Patent No.: US 10,640,391 B2
(45) Date of Patent: May 5, 2020

(54) LTO COATED LRMO CATHODE AND SYNTHESIS

(71) Applicant: FORD GLOBAL TECHNOLOGIES, LLC, Dearborn, MI (US)

(72) Inventors: Wenkui Zhang, Hangzhou (CN); Hui Huang, Hangzhou (CN); Yang Xia, Hangzhou (CN); Liyuang Zhang, Hangzhou (CN); Yishun Wang, Hangzhou (CN); Chu Liang, Hangzhou (CN); Xiao Guang Yang, Northville, MI (US); Robert J. Kudla, Canton, MI (US); Theodore James Miller, Milan, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 250 days.

(21) Appl. No.: 15/784,252

(22) Filed: Oct. 16, 2017

(65) Prior Publication Data
US 2019/0115590 A1    Apr. 18, 2019

(51) Int. Cl.
| | |
|---|---|
| *H01M 4/36* | (2006.01) |
| *H01M 4/131* | (2010.01) |
| *H01M 4/505* | (2010.01) |
| *H01M 4/525* | (2010.01) |
| *B01J 2/00* | (2006.01) |
| *C01G 23/00* | (2006.01) |
| *C01G 45/12* | (2006.01) |
| *H01M 4/62* | (2006.01) |
| *H01M 10/0525* | (2010.01) |

(52) U.S. Cl.
CPC ....... *C01G 23/005* (2013.01); *C01G 45/1221* (2013.01); *H01M 4/131* (2013.01); *H01M 4/36* (2013.01); *H01M 4/505* (2013.01); *H01M 4/525* (2013.01); *H01M 4/62* (2013.01); *H01M 10/0525* (2013.01); *C01P 2002/72* (2013.01); *C01P 2004/03* (2013.01); *C01P 2004/32* (2013.01); *C01P 2004/62* (2013.01); *C01P 2004/84* (2013.01); *C01P 2006/40* (2013.01)

(58) Field of Classification Search
None
See application file for complete search history.

(56) References Cited

U.S. PATENT DOCUMENTS

| | | |
|---|---|---|
| 7,713,662 B2 | 5/2010 | Tabuchi et al. |
| 8,535,832 B2 | 9/2013 | Karthlkeyan et al. |
| 9,252,455 B1 * | 2/2016 | Liu ................... H01M 10/0562 |

(Continued)

OTHER PUBLICATIONS

West, W.C. et al., Preparation of high quality layered-layered composite Li2MnO3—LiMO2 (M—Ni, Mn, Co) Li-ion cathodes by a ball milling-annealing process, J. of Power Sources, v. 204, Apr. 2012, pp. 200-204.

*Primary Examiner* — Christopher P Domone
(74) *Attorney, Agent, or Firm* — David Kelley; Brooks Kushman P.C.

(57) ABSTRACT

A method of forming a high energy density composite cathode material is disclosed. The method includes providing a lithium-rich manganese layered oxide (LRMO), coating the LRMO with a $TiO_2$ precursor, and ball-milling the $TiO_2$ coated LRMO with LiH to form a $Li_xTiO_2$ coated LRMO composite, wherein x is less than or equal to 1 and greater than zero.

17 Claims, 5 Drawing Sheets

(56) References Cited

U.S. PATENT DOCUMENTS

| | | | |
|---|---|---|---|
| 2004/0229123 A1* | 11/2004 | Takahashi | H01M 4/131 |
| | | | 429/231.1 |
| 2010/0297505 A1* | 11/2010 | Oki | H01M 4/58 |
| | | | 429/231.95 |
| 2012/0156565 A1 | 6/2012 | Kim et al. | |
| 2015/0372293 A1 | 12/2015 | Story et al. | |
| 2016/0315315 A1 | 10/2016 | Olken et al. | |
| 2016/0372739 A1 | 12/2016 | Song et al. | |

\* cited by examiner

LTO COATED LRMO CATHODE AND SYNTHESIS

TECHNICAL FIELD

The present disclosure relates to a lithium ion battery cathode material, and a method of producing the same.

BACKGROUND

Lithium ion batteries present a rechargeable electrochemical storage technology. Due to the electrochemical potential and theoretical capacity provided by the lithium ion batteries, the technology shows promise in large-scale energy storage systems such as those in automotive applications regarding electrification of the drivetrain and providing stationary storage solutions to enable effective use of renewable sources of energy. The energy density of conventional lithium ion batteries may not be able to meet the demand in next-generation applications.

Coating the surface of cathode materials with electrochemically inert oxides has been considered as an effective method to improve the electrochemical performance of lithium ion batteries, however cycling stability is not improved in some cases. Lithium-rich manganese layered oxides, or LRMO, show a high specific capacity (i.e., >280 mAh g$^{-1}$) and a high operating voltage. Although LRMO cathode materials have the potential to meet the energy-demanding requirements of mobile electronic devices and electrified vehicles, however, LRMO exhibits poor cycling performance, inferior rate capability, and voltage fade.

SUMMARY

According to an embodiment, a method of forming a high energy density composite cathode material is disclosed. The method includes providing a lithium-rich manganese layered oxide (LRMO), coating the LRMO with a TiO$_2$ precursor, and ball-milling the TiO$_2$ coated LRMO with LiH to form a Li$_x$TiO$_2$ coated LRMO composite, wherein x is less than or equal to 1 and greater than zero.

According to one or more embodiments, coating the LRMO with the TiO$_2$ precursor may include reacting the LRMO with titanium salt, deionized water, and alcohol. Further, the reacting may be performed in a hydrothermal reactor. The reacting may be performed at a temperature of about 100° C. to about 300° C., for about 1 to about 12 hours. In one or more embodiments, the coating may include calcining to form the TiO$_2$ coated LRMO after reacting the LRMO. Further, the calcining may be performed at about 300° C. to about 500° C., for about 30 minutes to about 8 hours. The calcining may be performed at a heating rate of about 1° C./min to about 10° C./min. In one or more embodiments, the TiO$_2$ may be about 0.1 wt. % to about 9 wt. % of the TiO$_2$ coated LRMO. In some embodiments, the LRMO may be xLi$_2$MnO$_3$.(1-x)LiMO$_2$, wherein M may be Mn, Ni, Co, Fe, Cr, Ti, Al, Mg, V, a rare earth metal, or a combination thereof, and x may be less than or equal to 1 and greater than zero. In one or more embodiments, the ball-milling may be performed at a rate of about 200 rpm to about 750 rpm, for about 6 hours to about 24 hours. In some embodiments, the providing may include co-precipitating the LRMO.

According to an embodiment, a method of forming a high energy density composite cathode material is disclosed. The method includes reacting a lithium-rich manganese layered oxide (LRMO) with a TiO$_2$ precursor in a hydrothermal reactor, calcining a precursor coated LRMO, and ball-milling the precursor coated LRMO with LiH to form a Li$_x$TiO$_2$ coated LRMO composite, wherein x is less than or equal to 1 and greater than zero.

According to one or more embodiments, the LRMO may be xLi$_2$MnO$_3$.(1-x)LiMO$_2$, where M may be Mn, Ni, Co, Fe, Cr, Ti, Al, Mg, V, a rare earth metal, or a combination thereof, and x may be less than or equal to 1 and greater than zero. In some embodiments, the TiO$_2$ precursor may be about 0.1 wt. % to about 9 wt. % of the precursor coated LRMO. In one or more embodiments, the calcining may be performed at a heating rate of about 1° C./min to about 10° C./min. In some embodiments, the ball-milling may be performed at a rate of about 200 rpm to about 750 rpm, for about 6 hours to about 24 hours. In one or more embodiments, a ratio of LiH to TiO$_2$ for the ball-milling may be about 1:1 to about 1.10:1.

According to an embodiment, a high energy density cathode composite material is disclosed. The high energy density cathode composite material includes a lithium-rich manganese layered oxide (LRMO) having the formula xLi$_2$MnO$_3$.(1-x)LiMO$_2$, where M is Mn, Ni, Co, Fe, Cr, Ti, Al, Mg, V, a rare earth metal, or a combination thereof, and x is less than or equal to 1 and greater than or equal to zero. The high energy density cathode composite material also includes a ball-milled Li$_x$TiO$_2$ coating on a surface of the LRMO.

According to one or more embodiments, the Li$_x$TiO$_2$ coating may be a ball-milled LiH and TiO$_2$ precursor composite coating on the LRMO. In some embodiments, the LRMO may have the formula Li[Li$_{(1-x-y-z)}$Ni$_x$Co$_y$Mn$_z$]O$_2$, and x, y, and z may be each independently less than or equal to 1 and greater than zero, or absent.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Except where expressly indicated, all numerical quantities in this description indicating dimensions or material properties are to be understood as modified by the word "about" in describing the broadest scope of the present disclosure. Practice within the numerical limits stated is generally preferred.

The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

Reference is being made in detail to compositions, embodiments, and methods of the present invention known to the inventors. However, it should be understood that disclosed embodiments are merely exemplary of the present invention which may be embodied in various and alternative forms. Therefore, specific details disclosed herein are not to be interpreted as limiting, rather merely as representative bases for teaching one skilled in the art to variously employ the present invention.

The description of a group or class of materials as suitable for a given purpose in connection with one or more embodiments of the present invention implies that mixtures of any two or more of the members of the group or class are suitable. Description of constituents in chemical terms refers to the constituents at the time of addition to any combination specified in the description, and does not necessarily preclude chemical interactions among constituents of the mixture once mixed. The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

Lithium ion batteries produce electricity by means of a cathode, an anode, and an electrolyte which connects and separates the two electrodes. Lithium ions migrate via the electrolyte from one electrode to the other while associated electrons are being collected by current collectors and may serve as an energy source for an electric device. Surface coatings on cathode materials may improve the electrochemical performance of lithium ion batteries.

In one or more embodiments of the present invention, a high energy density cathode composite material and a method of forming the same is provided. A $Li_xTiO_2$ coating on the surface of a lithium-rich manganese layered oxide (hereinafter, LRMO) as the cathode materials ($Li_xTiO_2$@LRMO) for Li-ion batteries provide high energy density and improved cycling stability. The $Li_xTiO_2$ coating is formed uniformly and effectively on the LRMO surface by ball-milling a $TiO_2$ precursor coated LRMO with lithium hydride (LiH). The $TiO_2$ precursor is coated on the LRMO surface in a hydrothermal reactor. As such, a $Li_xTiO_2$@LRMO composite material is formed and provides a high energy density cathode with improved cycling stability, rate capability, and voltage fade. The method is a cost-effective, convenient, efficient, and scalable process for industrial production, and provides a high-performance next generation Li-ion battery cathode material.

Figure 1:
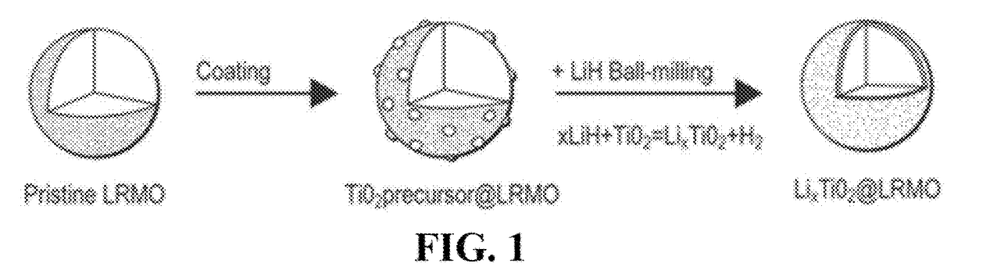
FIG. 1 is a schematic illustration showing the synthesis of the coated LRMO according to an embodiment.

Referring to FIG. 1, the synthesis of a $Li_xTiO_2$@LRMO composite cathode material is schematically shown. First, the LRMO material is synthesized. The LRMO material may be prepared by any traditional methods, such as, but not limited to, co-precipitation. According to one or more embodiments, the LRMO is expressed as having the formula: $xLi_2MnO_3 \cdot (1-x)LiMO_2$ (M=Mn, Ni, Co, 0<x<1). Although a lithium-rich manganese layered oxide is presented as an example, the method of the present invention is not intended to be limiting. As such, the synthesis method and promising effect of the $Li_xTiO_2$ coating may also be utilized on other cathode materials such as lithium metal phosphates ($LiMPO_4$), or LRMO oxides (where M=Mn, Ni, Co, Fe, Cr, Ti, Al, Mg, V, rare earth metals, etc.), or some combination thereof, and the below embodiment is intended to be a non-limiting example.

The as-synthesized LRMO material is then reacted to form an intermediate composite of LRMO coated with a $TiO_2$ precursor coating. The reaction takes place in a hydrothermal reactor. For the preparation of the intermediate composite (or the precursor/$TiO_2$ coated LRMO), the LRMO, titanium salt, deionized water, and alcohol are combined and put into the hydrothermal reactor. For the hydrothermal reaction, the alcohol may be, but is not limited to, ethylene glycol, ethanol, propanol, propylene glycol, glycerol, or a combination thereof. For the hydrothermal reaction, the titanium salt may be, but is not limited to, titanium trichloride, titanium tetrachloride, tetrabutyl titanate, titanium tetrafluoride, or a combination thereof. The combined reactants may be mixed at certain molar ratios prior to being provided to the reactor. For example, to form a mixed solution for the hydrothermal reaction, the LRMO material and titanium salt are added into the water/alcohol solution under stirring. The mixed solution is then provided to the hydrothermal reactor with the LRMO material. The ratio of water to alcohol in the hydrothermal reactor may be about 1:10 to about 1:60. Preferably, the ratio of water to alcohol in the hydrothermal reactor is about 1:10, 1:20, 1:30, 1:40, 1:50, or 1:60. Hydrothermal reaction may be carried out at a temperature of about 100 to 300° C., or more preferably 120 to 180° C., and is carried on for about 1 to about 12 hours.

After the hydrothermal reactor, the intermediate composite is collected, dried, and calcined to form $TiO_2$@LRMO (the precursor/$TiO_2$ coated LRMO). The calcination may be performed in a laboratory furnace, high temperature oven, or any other equipment capable of calcining. The calcination treatment may be performed at a calcination temperature of about 300 to about 500° C. The heating rate to the calcination temperature for treatment may be about 1 to about 10° C./min. The calcination treatment may be carried out for about 30 minutes to about 8 hours. After calcination, the precursor coated LRMO is obtained with a $TiO_2$ content from about 0.1 to 9% by weight of LRMO. Preferably, the $TiO_2$ content may be from 1 to 5% by weight of LRMO.

After calcining, the $TiO_2$@LRMO is ball-milled with lithium hydride (LiH) to form $Li_xTiO_2$@LRMO composite cathode material. The ratio of LiH to $TiO_2$ for ball-milling may be about 1:1 to about 1.10:1. The ball-milling may be performed at a rate of about 200 to about 750 rpm. The ball-milling treatment may be carried out for about 6 to about 24 hours. The amount of $Li_xTiO_2$ coating on the LRMO material after ball-milling may be about 0.1%-9% by weight. Preferably, the amount of $Li_xTiO_2$ coating on the LRMO material after ball-milling may be about 1% and about 5% by weight. In some embodiments, the amount of $Li_xTiO_2$ coating on the LRMO material may be about 0.1%, 1%, 2%, 3%, 4%, 5%, 6%, 7%, 8%, or 9% by weight.

The $Li_xTiO_2$@LRMO active material can then be incorporated into a cathode of the Li-ion battery. An exemplary cathode may include about 80 wt % $Li_xTiO_2$@LRMO, about 10 wt % conductive agent, and 10 wt % binder. The conductive agent may be any suitable conductive agent, including but not limited to, Super P carbon black. The binder may be any suitable binder, including but not limited to, polyvinylidenefluoride.

As such, a high energy density cathode composite material and a method of forming the same is provided. The $Li_xTiO_2$ coating on the surface of the LRMO ($Li_xTiO_2$@LRMO) as the cathode materials provide high energy density and improved cycling stability, rate capability, and voltage fade for Li-ion batteries. Hydrothermal reaction and ball-milling provides a cost-effective, convenient, efficient, and scalable process for industrial production, and provides a high-performance next generation Li-ion battery cathode material.

EXPERIMENTAL RESULTS

Example 1

Sample 1

First, 1.4553 g LRMO material is added into a mixed solution consisting of 0.7030 g $TiCl_3$/HCl solution (16 wt %), 0.7 ml water and 25 ml glycol, under ultrasound stirring for 30 min. Then the solution is transferred to a 60 ml hydrothermal reactor in which the hydrothermal reaction is carried out for 4 h at 150° C. The resultant sample is filtered, washed, dried, and then calcined at 350° C. for 4 h in air. The target product, $Li_xTiO_2$@LRMO, is obtained after ball milling treatment with a certain amount of LiH at the rate of 500 rpm for 12 h. In sample 1, the $Li_xTiO_2$ concentration is estimated to be 5 wt %.

Figure 2A:
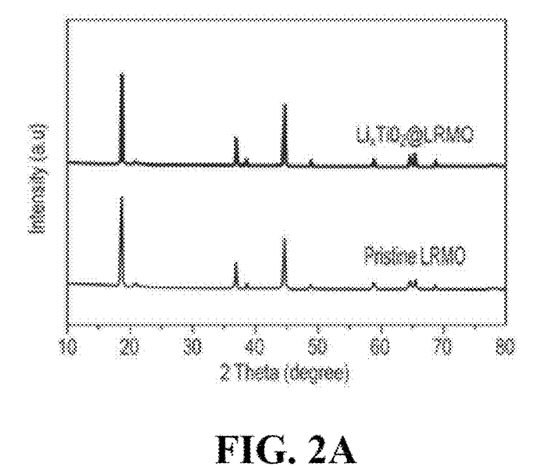
FIG. 2A is a graph showing x-ray diffraction patterns of coated LRMO according to an embodiment vs. pristine LRMO.
Figure 2B:
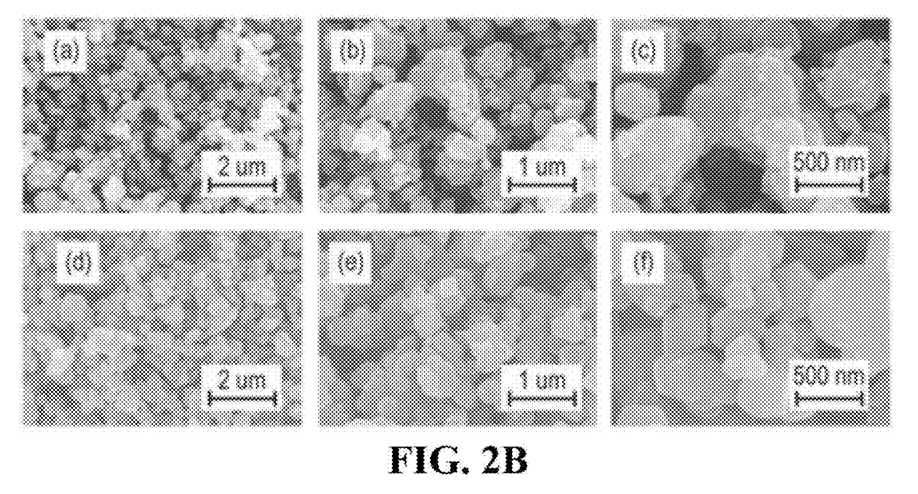
FIG. 2B shows SEM images of pristine LRMO ((a)-(c)) and the coated LRMO ((d)-(f)) according to an embodiment.

FIG. 2A shows a comparison of the x-ray diffraction patterns of the pristine LRMO and $Li_xTiO_2$@LRMO (sample 1). FIG. 2A shows that the coating process does not change the structure of the Li-rich manganese layered oxide material. FIG. 2B shows the SEM images of the pristine LRMO and the $Li_xTiO_2$@LRMO (sample 1) materials. The surface of $Li_xTiO_2$@LRMO is well coated with a certain amount of lithium titanate, and the $Li_xTiO_2$@LRMO is nearly spherical with a particle size of a few hundred nanometers.

The detailed steps of assembling lithium ion batteries using $Li_xTiO_2$@LRMO as cathode materials are briefly described as follows: The working electrode consists of 80 wt % $Li_xTiO_2$@LRMO active material, 10 wt % conductive agent (Super P carbon black), and 10 wt % binder (polyvinylidenefluoride). All electrodes are punched into aluminum foil (diameter: 12 mm). Lithium foil is used as the counter electrode in coin half-cells. $LiPF_6$ (1 mol/L) in a mixture of ethylene carbonate (EC)-diethyl carbonate (DEC) with a volume ratio EC:DEC=1:1 is used as the electrolyte and a polypropylene membrane (Celgard 2300) is used as the separator.

Figure 3:
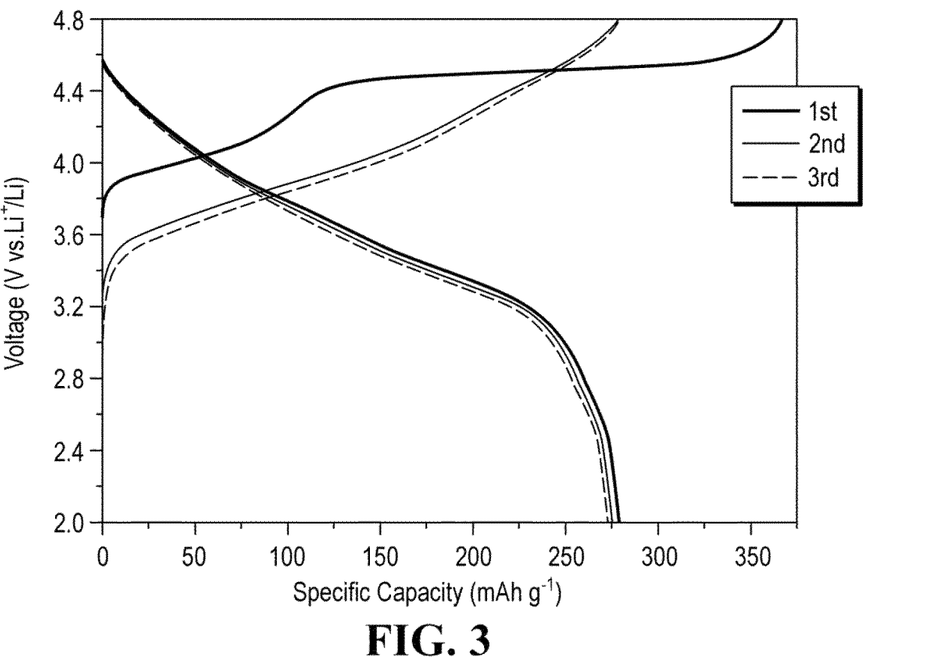
FIG. 3 is a graph showing the initial charge and discharge curves of the coated LRMO according to an embodiment.

FIG. 3 shows the initial charge/discharge curves of $Li_xTiO_2$@LRMO (sample 1) at a current density of 30 mA/g in the range of 2.0-4.8 V. The initial discharge capacity is 272 mAh/g.

Figure 4:
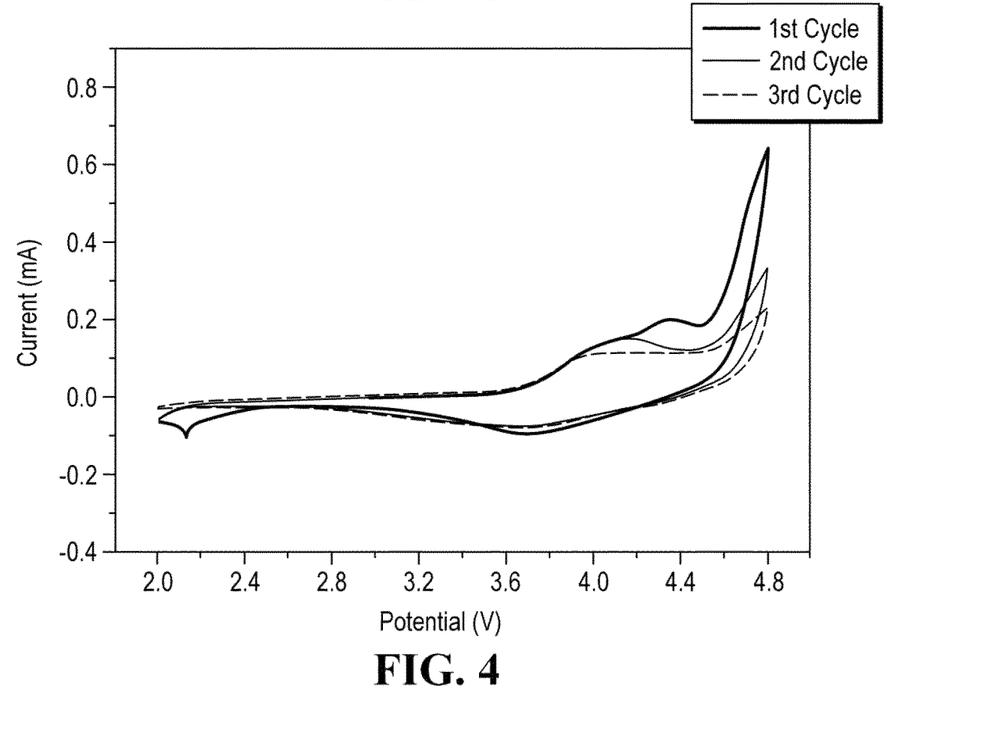
FIG. 4 is a graph showing cyclic voltammetry curves of the coated LRMO according to an embodiment.
Figure 5:
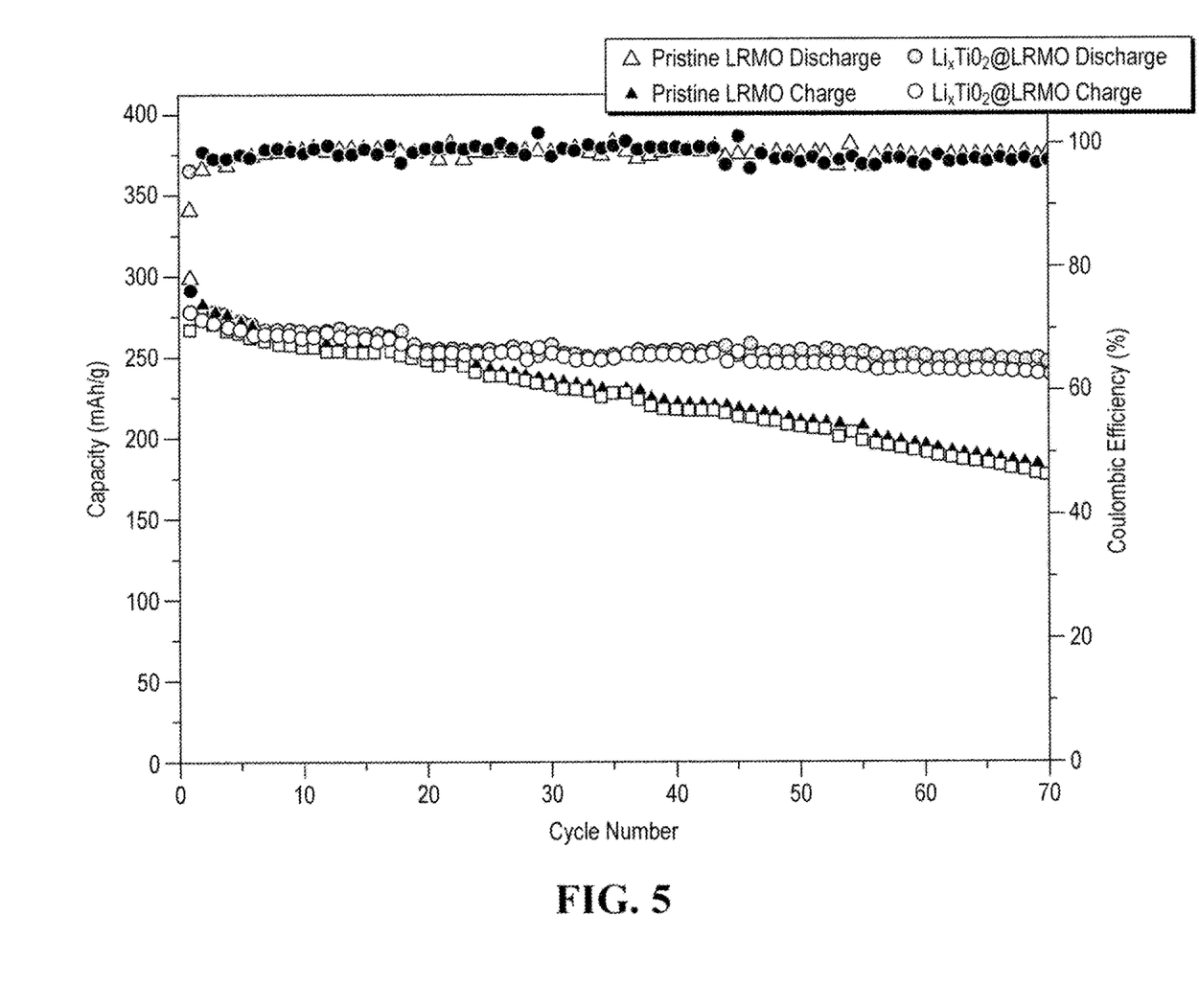
FIG. 5 is a graph showing the cycling performance of pristine LRMO and the coated LRMO at 0.1 C according to an embodiment.
Figure 6:
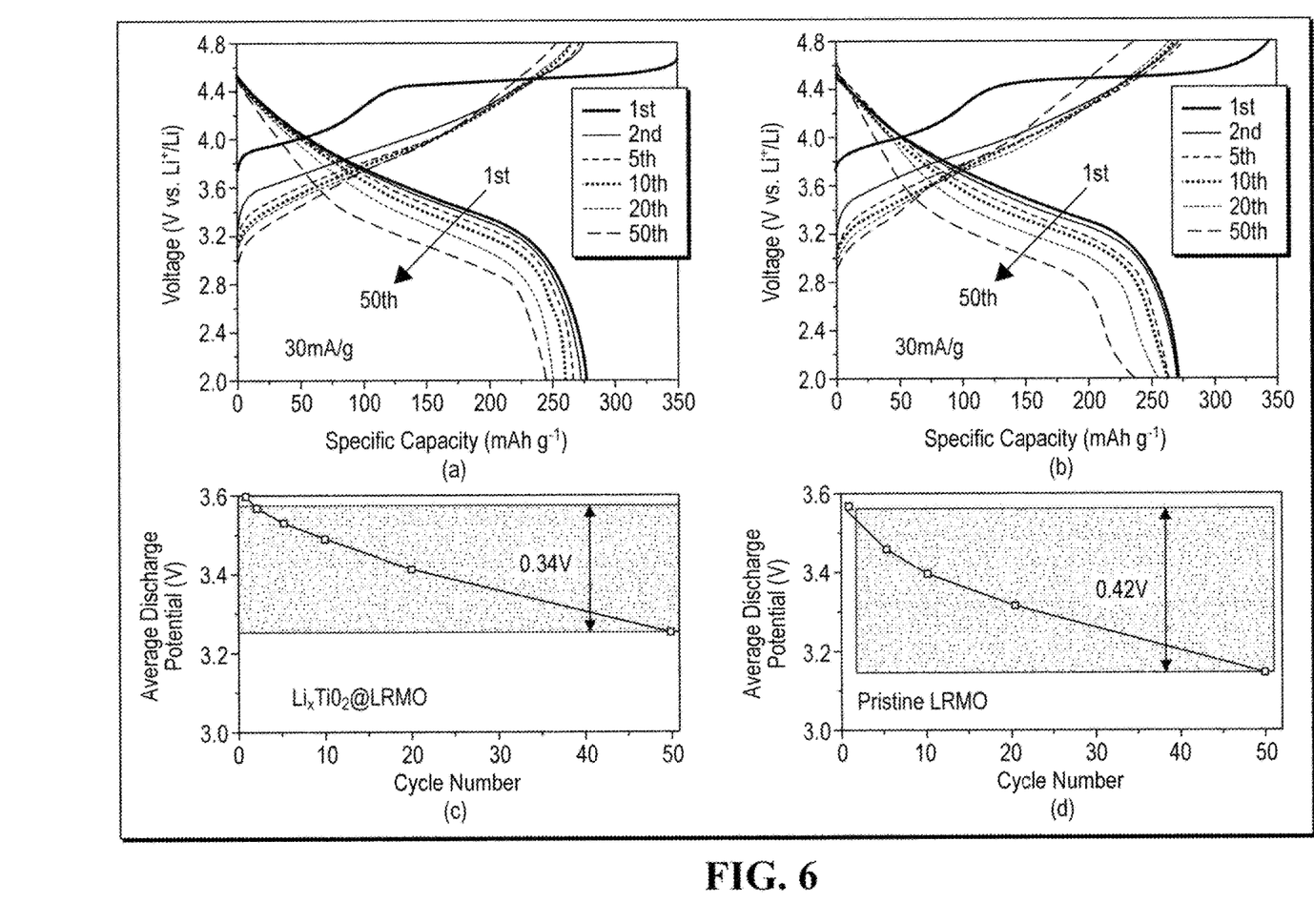
FIG. 6 shows graphs of the charge and discharge curves of pristine LRMO and the coated LRMO according to an embodiment.
Figure 7:
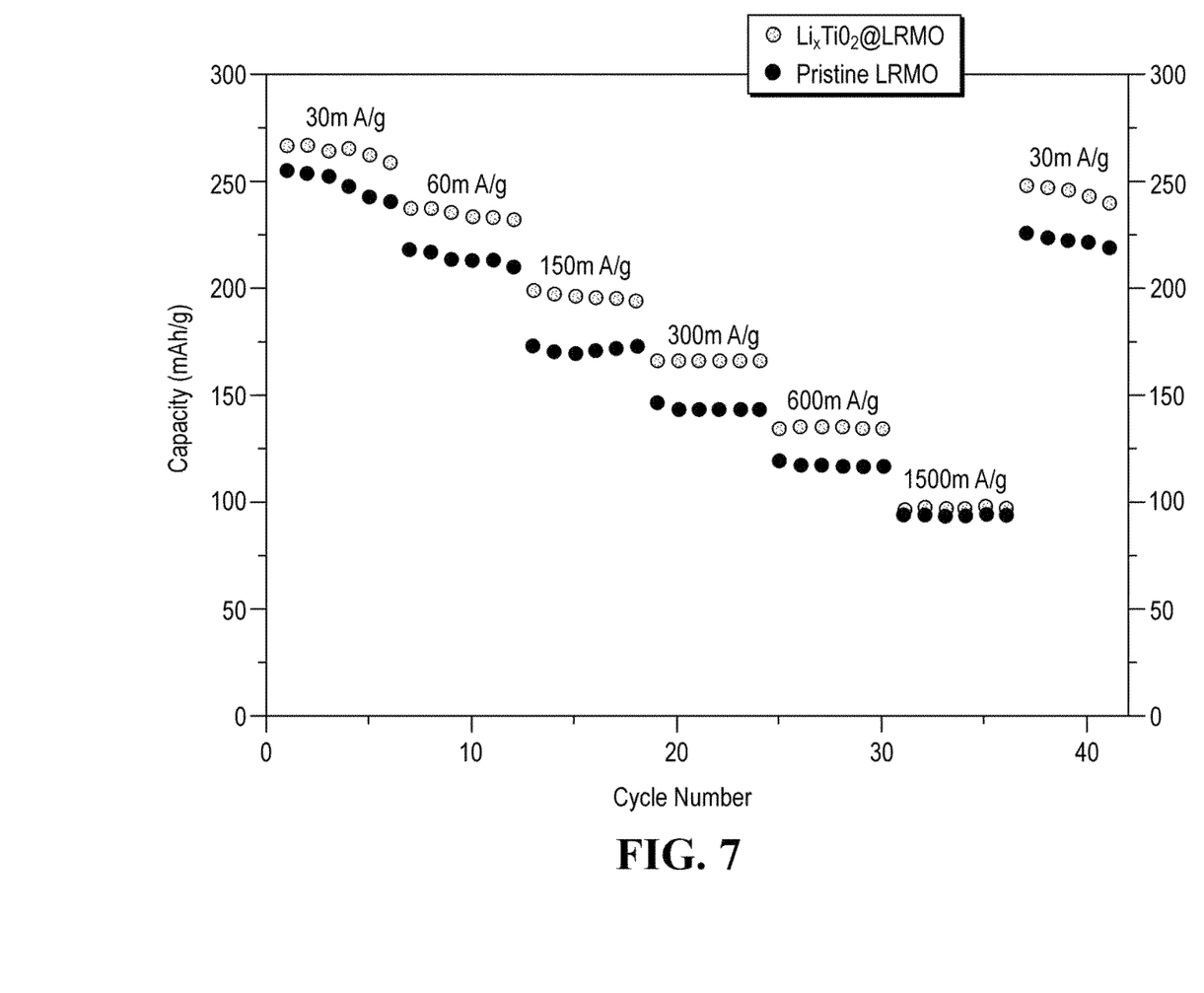
FIG. 7 is a graph showing the rate capability of pristine LRMO and the coated LRMO according to an embodiment.

FIG. 4 shows the CV curves of $Li_xTiO_2$@LRMO (sample 1) at the scan rate of 0.1 mV/s. FIG. 5 shows the cycle performance of $Li_xTiO_2$@LRMO (sample 1) at the current density of 0.03 A/g. FIG. 6 shows the charge/discharge curves and average discharge voltage of sample 1 and pristine LRMO. FIG. 7 shows the rate capability of sample 1 and LRMO.

Samples 2-5

Similar to example 1, the Li-rich layered oxide material (LRMO) with different amounts of lithium titanate is obtained by adjusting the amount of lithium titanate. The other synthesis conditions and cell fabrication are similar to example 1. The test results of battery performance are shown in Table 1.

TABLE 1

| Sample | Amount of lithium titanate, (wt %) | Initial discharge Capacity (mAh/g) | Capacity retention after 100 cycles |
|---|---|---|---|
| Sample 2 | 1% | 282 | 72% |
| Sample 3 | 2% | 271 | 74% |
| Sample 4 | 3% | 269 | 78% |
| Sample 5 | 5% | 248 | 77% |

Samples 6-13

Additional samples were synthesized according to example 1, by changing the time and rate of ball-milling while keeping all other conditions the same. The test results of battery performance are shown in Table 2.

TABLE 2

| sample | Milling time (h) | Milling speed (rpm) | Initial discharge Capacity (mAh/g) | capacity retention after 100 cycles |
|---|---|---|---|---|
| Sample6 | 8 | 350 | 258 | 71% |
| Sample7 | 16 | 350 | 262 | 80% |
| Sample8 | 20 | 350 | 261 | 74% |
| Sample9 | 24 | 350 | 254 | 71% |
| Sample10 | 8 | 600 | 267 | 74% |
| Sample11 | 16 | 600 | 265 | 72% |
| Sample12 | 20 | 600 | 258 | 75% |
| Sample13 | 24 | 600 | 248 | 69% |

Samples 14-17

According to example 1, additional samples were synthesized by changing the time and temperature of hydrothermal reaction while keeping other conditions the same as in example 1. The test results of battery performance are shown in Table 3.

TABLE 3

| sample | hydrothermal reaction temperature (° C.) | hydrothermal reaction time (h) | Initial discharge Capacity (mAh/g) | capacity retention after 100 cycles |
|---|---|---|---|---|
| Sample14 | 120 | 2 | 248 | 65% |
| Sample15 | 120 | 6 | 259 | 67% |
| Sample16 | 180 | 2 | 230 | 63% |
| Sample17 | 180 | 6 | 208 | 56% |

Samples 18-21

Samples 18-21 were prepared by changing the time and temperature of calcination reaction of example 1, and keeping other conditions the same as in example 1. The test results of battery performance are shown in Table 4.

TABLE 4

| sample | Calcination temperature (° C.) | calcination time (h) | Initial discharge capacity (mAh/g) | capacity retention after 100 cycles |
|---|---|---|---|---|
| sample 18 | 300 | 3 | 258 | 72% |
| sample 19 | 300 | 5 | 262 | 75% |
| sample 20 | 400 | 3 | 264 | 77% |
| sample 21 | 400 | 5 | 251 | 69% |

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of forming a composite cathode material comprising:
   providing a lithium-rich manganese layered oxide (LRMO) having the formula $xLi_2MnO_3.(1-x)LiMO_2$, wherein M is Mn, Ni, Co, Fe, Cr, Ti, Al, Mg, V, a rare earth metal, or a combination thereof, and x is less than or equal to 1 and greater than zero;
   coating the LRMO with a $TiO_2$ precursor; and
   ball-milling the $TiO_2$ coated LRMO with LiH to form a $Li_xTiO_2$ coated LRMO composite, wherein x is less than or equal to 1 and greater than zero.

2. The method of claim 1, wherein coating the LRMO with the $TiO_2$ precursor includes reacting the LRMO with titanium salt, deionized water, and alcohol.

3. The method of claim 2, wherein the reacting is performed in a hydrothermal reactor.

4. The method of claim 2, wherein the reacting is performed at a temperature of about 100° C. to about 300° C., for about 1 to about 12 hours.

5. The method of claim 2, wherein the coating includes calcining to form the $TiO_2$ coated LRMO after reacting the LRMO.

6. The method of claim 5, wherein the calcining is performed at about 300° C. to about 500° C., for about 30 minutes to about 8 hours.

7. The method of claim 6, herein the calcining is performed at a heating rate of about 1° C./min to about 10° C./min.

8. The method of claim 1, wherein the $TiO_2$ is about 0.1 wt. % to about 9 wt. % of the $TiO_2$ coated LRMO.

9. The method of claim 1, wherein the ball-milling is performed at a rate of about 200 rpm to about 750 rpm, for about 6 hours to about 24 hours.

10. The method of claim 1, wherein the providing includes co-precipitating the LRMO.

11. A method of forming a composite cathode material comprising:
    reacting a lithium-rich manganese layered oxide (LRMO) with a $TiO_2$ precursor in a hydrothermal reactor, the LRMO having the formula $xLi_2MnO_3.(1-x)LiMO_2$, where M is Mn, Ni, Co, Fe, Cr, Ti, Al, Mg, V, a rare earth metal, or a combination thereof, and x is less than or equal to 1 and greater than zero;
    calcining a precursor coated LRMO; and
    ball-milling the precursor coated LRMO with LiH to form a $Li_xTiO_2$ coated LRMO composite, wherein x is less than or equal to 1 and greater than zero.

12. The method of claim 11, wherein the $TiO_2$ precursor is about 0.1 wt. % to about 9 wt. % of the precursor coated LRMO.

13. The method of claim 11, wherein the calcining is performed at a heating rate of about 1° C./min to about 10° C./min.

14. The method of claim 11, wherein the ball-milling is performed at a rate of about 200 rpm to about 750 rpm, for about 6 hours to about 24 hours.

15. The method of claim 11, wherein a ratio of LiH to $TiO_2$ for the ball-milling is about 1:1 to about 1.10:1.

16. A cathode composite material comprising:
    a lithium-rich manganese layered oxide (LRMO) having the formula $xLi_2MnO_3.(1-x)LiMO_2$; and
    a ball-milled $Li_xTiO_2$ coating on a surface of the LRMO, the ball-milled $Li_xTiO_2$ coating being a ball-milled LiH and $TiO_2$ precursor composite coating on the LRMO, wherein M is Mn, Ni, Co, Fe, Cr, Ti, Al, Mg, V, a rare earth metal, or a combination thereof, and x is less than or equal to 1 and greater than or equal to zero.

17. The cathode composite material of claim 16, wherein the LRMO has the formula $Li[Li_{(1-x-y-z)}Ni_xCo_yMn_z]O_2$, and x, y, and z are each independently less than or equal to 1 and greater than zero, or absent.

* * * * *